United States Patent [19]

Strabberger

[11] 3,928,404

[45] Dec. 23, 1975

[54] PROCESS FOR THE PREPARATION OF HIGH MOLECULAR WEIGHT ALIPHATIC MONOCARBOXYLIC ACIDS BY SILICATE CONTACT AND CHROMOSULFURIC ACID OXIDATION OF α-OLEFINS

[75] Inventor: Werner Strabberger, Gersthofen, Germany

[73] Assignee: Hoechst Aktiengesellschaft, Frankfurt am Main, Germany

[22] Filed: Aug. 15, 1974

[21] Appl. No.: 497,745

[30] Foreign Application Priority Data
Aug. 21, 1973  Germany............................ 2342089

[52] U.S. Cl............................ 260/413; 260/677 AD
[51] Int. Cl.².............................................. C11C 1/00
[58] Field of Search............ 260/413, 533 R, 604 R, 260/677 AD

[56] References Cited
UNITED STATES PATENTS

| | | | |
|---|---|---|---|
| 2,450,858 | 10/1948 | Fitzpatrick.......................... | 260/413 |
| 2,470,515 | 5/1949 | Myers et al.......................... | 260/413 |
| 2,644,837 | 7/1953 | Schweitzer......................... | 260/484 |
| 3,692,810 | 9/1972 | Washecheck....................... | 260/413 |

FOREIGN PATENTS OR APPLICATIONS

| | | | |
|---|---|---|---|
| 2,165,858 | 7/1973 | Germany............................ | 260/413 |
| 2,262,130 | 7/1974 | Germany............................ | 260/413 |

Primary Examiner—Winston A. Douglas
Assistant Examiner—P. E. Konopka
Attorney, Agent, or Firm—Connolly and Hutz

[57] ABSTRACT

Aliphatic monocarboxylic acids having from 16 to 70 carbon atoms in the molecule and being color-stable to ammonia and amines are prepared by chromosulfuric acid oxidation of such industrial-grade γ-olefin mixtures which, before the oxidation, have been subjected to a thermal treatment in the presence of catalytic amounts of a silicate having a lamellar structure. The cited carboxylic acids are suitable for the manufacture of waxy substances.

4 Claims, No Drawings

PROCESS FOR THE PREPARATION OF HIGH MOLECULAR WEIGHT ALIPHATIC MONOCARBOXYLIC ACIDS BY SILICATE CONTACT AND CHROMOSULFURIC ACID OXIDATION OF α-OLEFINS

The synthesis of high molecular weight aliphatic carboxylic acids by oxidation of long-chain α-olefins with chromosulfuric acid is known (see German Offenlegungsschriften Nos. 2 165 858 and 2 262 130). Depending on the amount of oxidation agent used, such oxidation products still contain more or less starting material. When the oxidation is started with pure α-olefins, the residual content of non-reacted α-olefin must not be eliminated if it does not disturb the further processing of the carboxylic acid. In the case, however, where commercial industrial-grade α-olefins are used, a yellow discoloration of the carboxylic acids so obtained is observed if they are contacted with ammonia or amines, or if they are emulsified in the presence of these bases. This discoloration is disadvantageous since it reduces the application range of the acids or even makes their application impossible. Responsible for this discoloration are the vinylidene groups contained in industrial-grade α-olefins in an amount of from 20 to 30 % or their secondary oxidation products such as carbonyl compounds.

It is the object of the present invention to realize the chromic acid oxidation of industrial-grade α-olefins or α-olefin mixtures in such a manner that oxidation products are obtained which are free from the cited drawbacks.

The present invention therefore provides a process for the preparation of high molecular weight saturated aliphatic carboxylic acids being color-stable to ammonia and amines, by oxidation of α-olefins or α-olefin mixtures having from 16 to 70 carbon atoms in the molecule with chromosulfuric acid, which comprises in a first step intensely contacting in the melt an industrial-grade mixture of olefins having vinyl double bonds and olefins having vinylidene double bonds and olefins having transvinylene double bonds with from 0.01 to 5.0 weight %, relative to the olefins, of a silicate having a lamellar structure, and in a second step carrying out the oxidation with aqueous chromosulfuric acid.

According to the process of the invention it is possible to obtain high molecular weight aliphatic monocarboxylic acids or monocarboxylic acid mixtures which are hard and completely colorless, which have an excellent thermostability in the presence of nitrogen bases and which, except relatively small amounts of paraffins, do not contain impurities having a negative effect.

As starting material for the process of the invention there are used industrial-grade α-olefins or mixtures of α-olefins having from 16 to 70 carbon atoms in the molecule; preferred are commercial mixtures of α-olefins having from 24 to 48 carbon atoms. The infrared spectrum of such industrial-grade α-olefins shows that besides vinyl double bonds (R-CH=CH$_2$), vinylidene

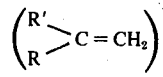

and transvinylene

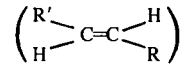

double bonds are always present. For example, a commercial α-olefin mixture "$C_{24}$ to $C_{48}$" is composed of from 60 to 65 weight % of vinyl, from 20 to 25 weight % of vinylidene, and from 3 to 7 weight % of transvinylene hydrocarbons, and of from 3 to 5 weight % of paraffin hydrocarbons.

By silicates having lamellar structure, which are also named phyllosilicates, there are to be understood aluminum and/or magnesium containing silicates which substantially are composed of two-dimensionally juxtaposed six-membered rings (the ratio of Si : 0 is 2 : 5, and each tetrahedron has one oxygen atom of three such atoms in common with another tetrahedron). Examples of these silicates are pyrophyllite, montmorillinite, talcum, antigorite or kaolinite. Especially suitable are the bleaching earths belonging to the montmorillonite group, that is, most finely distributed watercontaining aluminum/magnesium silicates which are also named fuller's earth, Florida bleaching earth, soap rock or bentonite, as well as talcum, a hydroxyl group containing magnesium silicate. These silicates are used in amounts of from 0.01 to 5, preferably from 0.5 to 2 % by weight, relative to the olefins.

The olefins are intimately contacted in molten state and with agitation with the silicates used in accordance with the present invention, at a temperature of from 120° to 350°C, preferably from 150° to 270°C, which causes a conversion of the vinylidene double bonds to the vinyl and transvinylene double bonds. The reaction is continued until at least 75 % of the initial double bonds are present in the form of vinyl or transvinylene double bonds. After a reaction time of from 0.5 to 7 hours, preferably from 2 to 4 hours, the isomerization degree generally exceeds 95 %.

Whether the isomerization proceeds with formation of vinyl double bonds or transvinylene double bonds depends above all on the kind of catalyst used, and, to a smaller extent, on the temperature. When, for example, an active bleaching earth is used, the vinylidene double bond, at a temperature of from 120° to 200°C is partially isomerized to yield the vinyl double bond and partially to give the transvinylene double bond; at a temperature of from 200° to 350°C, preferably from 220° to 270°C, only transvinylene double bonds are obtained. When talcum is employed as catalyst and at reaction temperatures of from 220° to 290°C, preferably from 240° to 270°C, the vinylene double bonds are converted to vinyl double bonds in the first place.

After having optionally filtered off the isomerization catalyst, the oxidation of the isomerized olefin mixture with aqueous chromosulfuric acid containing from 50 to 140 g of $CrO_3$ and from 300 to 650 g of $H_2SO_4$ per liter is carried out at a temperature of from 80° to 150°C. The $CrO_3$ amount is from 100 to 250 %, relative to the weight of the olefins to be oxidized. The oxidation agent may be added in one or several portions. It is also possible to introduce first the oxidation agent into the vessel and to add then the olefin melt.

When the oxidation is complete, the molten oxidation product is separated from the consumed chromium (III) salt solution and washed with dilute sulfuric acid at 90° to 100°C until no chromium ions can be detected any more; and subsequently, the product is treated with hot water until it is free from sulfuric acid.

The high molecular weight carboxylic acids obtained are colorless and practically free from by-products having a negative effect, which makes them color-stable to nitrogen bases. Because of their hardness, the carboxylic acids obtained with concentration of vinyl groups are especially suitable for the preparation of wax-like esters or partially neutralized esters which may be processed to floorwaxes or glosses. The carboxylic acids obtained via a preceding transvinylene isomerization may be used for the same application; however, they are especially appropriate for the preparation of metallic soaps and amides for the processing of plastics.

The following examples illustrate the invention.

EXAMPLE 1

In a three-necked flask having a capacity of 10 liters and provided with agitator and internal thermometer, 5 kg of an industrial-grade mixture of α-olefins having from 24 to 48 carbon atoms were stirred at the chosen temperature and under a nitrogen atmosphere in the presence of an isomerization catalyst. Subsequently, the reaction mixture was cooled to about 100°C and filtered by means of a heated pressure filter. By analytic examination of the starting material, the distribution of the double bonds was evaluated. Test conditions and results are listed in the following Table. The practically unchanged iodine number proves that the sum of the double bonds has remained constant.

| Ex. | Treatment | Double bonds in the final product (%) | | | iodine 2) number |
|---|---|---|---|---|---|
| | | vinyl | vinyl-idene | trans-vinyl-ene | |
| 1 a | | 67.4 | 29.1 | 3.5 | 46.0 |
| 1 b | 1 % bleaching earth 1) 150°C 7 hours | 89.4 | 1.9 | 8.7 | 46.3 |
| 1 c | 1 % bleaching earth 200°C 7 hours | 68.6 | 5.0 | 26.4 | 46.1 |
| 1 d | 1 % bleaching earth 250°C 7 hours | <1.0 | <1.0 | >99.0 | 46.4 |
| 1 e | 0.5 % bleaching earth 250°C 4.5 hours | <1.0 | <1.0 | >99.0 | 46.1 |
| 1 f | 1 % talcum 250°C 3 hours | 93.0 | 1.6 | 5.4 | 46.2 |
| 1 g | 1 % talcum 250°C 7 hours | 91.4 | 1.9 | 6.7 | 46.0 |
| 1 h | 0.5 % talcum 290°C 7 hours | 83.5 | 2.3 | 14.2 | 46.4 |

1) Tonsil opt. of Sued-Chemie, Munich
2) according to Kaufmann 90 g of the product according to Example 1d in molten state were stirred at 112° to 115°C with 1470 ml of chromosulfuric acid (108 g of $CrO_3$/liter), until the $CrO_3$ content of the acid phase had decreased to less than 5 g of $CrO_3$/liter. The chromium sulfate solution was let off and the liquid wax was washed with dilute sulfuric acid until it was free from chromium, and subsequently with water until it was free from sulfuric acid.

The product dried at 90°C in vacuo was purely white, it had an acid number of 120, and 5.4 weight % of neutral matter. Carbonyl compounds could not be detected.

EXAMPLE 2

As described in Example 1, 5 kg of the same α-olefin mixture were stirred in the presence of 0.5 weight % of bleaching earth for 2.5 hours at 240°–260°C. The product obtained, 99 % of the double bonds of which were in transvinylene position, was subjected to the chromosulfuric acid treatment without eliminating the catalyst. According to Example 1, 90 g were oxidized in two steps, at first with 1050 ml (= 125 % of $CrO_3$) of chromosulfuric acid until this amount was consumed, and then, after separation of the chromium sulfate solution, with 420 ml (50 % of $CrO_3$) of chromosulfuric acid, so that a total of 175 % of $CrO_3$ was used. After separation, washing and drying of the oxidation product obtained, a carboxylic acid mixture having an acid number of 120 and 6.0 weight % of neutral matter was obtained. The carbonyl number was 0.

EXAMPLE 3

100 g of the mixture obtained according to Example 1f were oxidized according to the two-step process described in Example 2, in the first step with 1200 ml of chromosulfuric acid containing 104 g of $CrO_3$/liter (125 % of $CrO_3$), and in the second step with 480 ml of the same chromosulfuric acid (50 % of $CrO_3$). The oxidation temperature was 115°C. A waxy carboxylic acid mixture having an acid number of 118 and a content of 5.2 weight % of neutral matter was obtained. The carbonyl number was 0.

Comparative Example

For a comparison, the same α-olefin mixture which, however, had not been pretreated with bleaching earth, was oxidized as indicated in Example 1. The oxidation product had an acid number of 113, it contained 19.5 weight % of neutral matter and had a carbonyl number of 10.

The necessity of obtaining oxidation products being free from carbonyl groups is proved by a stability test on the oxidation products contacted with amines:

The products of Examples 1 to 4 were cast to form little square plates (50 × 50 × 5 mm) which were stored for 24 hours in an ammonia atmosphere in an exsiccator. Subsequently, the color of the samples was visually evaluated. While the acids prepared according to Examples 1 to 3 remained colorless (iodine color number 2), the product obtained according to the Comparative Example showed a yellow discoloration and, in contrast to an initial iodine color number of 4, it then had an iodine color number of 13 to 15.

What is claimed is:

1. A process for the preparation of high molecular weight saturated aliphatic carboxylic acids being color-stable to ammonia and amines, by oxidation of α-olefins or α-olefin mixtures having from 16 to 70 carbon atoms in the molecule with chromosulfuric acid, which comprises in a first step intensely contacting in the melt said α-olefins or α-olefin mixtures having vinyl double bonds and olefins having vinylidene double bonds and olefins having transvinylene double bonds with from 0.01 to 5.0 weight %, relative to the olefins, of a silicate having a lamellar structure at a temperature of 120° to 350°C and in a second step carrying out the oxidation with aqueous chromosulfuric acid at a temperature of 80° to 150°C.

2. The process as claimed in claim 1, which comprises using bleaching earth as silicate having a lamellar structure.

3. The process as claimed in claim 1, which comprises using talcum as silicate having a lamellar structure.

4. The process as claimed in claim 1, which comprises using as aqueous chromosulfuric acid a chromosulfuric acid containing from 50 to 140 g of chromium trioxide and from 300 to 650 g of sulfuric acid per liter.

* * * * *